United States Patent
Adkisson

(10) Patent No.: US 7,239,681 B2
(45) Date of Patent: Jul. 3, 2007

(54) SYSTEM AND METHOD FOR MAINTAINING A STABLE SYNCHRONIZATION STATE IN A PROGRAMMABLE CLOCK SYNCHRONIZER

(75) Inventor: Richard W. Adkisson, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 747 days.

(21) Appl. No.: 10/630,297

(22) Filed: Jul. 30, 2003

(65) Prior Publication Data

US 2004/0223565 A1 Nov. 11, 2004

Related U.S. Application Data

(60) Provisional application No. 60/469,120, filed on May 9, 2003.

(51) Int. Cl.
*H04L 7/00* (2006.01)
(52) U.S. Cl. ............ 375/354; 375/214; 375/219; 375/371; 375/220; 713/500; 713/503
(58) Field of Classification Search ........... 375/371, 375/219, 354, 214; 713/500, 503
See application file for complete search history.

(56) References Cited

U.S. PATENT DOCUMENTS

| | | | |
|---|---|---|---|
| 5,223,755 A * | 6/1993 | Richley .................. 327/158 |
| 5,347,559 A | 9/1994 | Hawkins et al. | |
| 5,721,886 A | 2/1998 | Miller | |
| 6,075,832 A | 6/2000 | Geannopoulos et al. | |
| 6,084,934 A | 7/2000 | Garcia et al. | |
| 6,114,915 A | 9/2000 | Huang et al. | |
| 6,134,155 A | 10/2000 | Wen | |
| 6,175,603 B1 | 1/2001 | Chapman et al. | |
| 6,188,286 B1 * | 2/2001 | Hogl et al. ............... 331/2 |
| 6,246,275 B1 | 6/2001 | Wodnicki et al. | |
| 6,249,875 B1 | 6/2001 | Warren | |
| 6,326,824 B1 | 12/2001 | Hosoe et al. | |
| 6,369,624 B1 | 4/2002 | Wang et al. | |
| 6,473,439 B1 * | 10/2002 | Zerbe et al. ............ 370/503 |
| 6,529,083 B2 | 3/2003 | Fujita | |
| 2002/0051509 A1 | 5/2002 | Lindner et al. | |
| 2002/0158671 A1 | 10/2002 | Wang et al. | |
| 2002/0199124 A1 | 12/2002 | Adkisson | |
| 2004/0028165 A1 * | 2/2004 | Bogdan ................. 375/375 |

* cited by examiner

*Primary Examiner*—Mohammed Ghayour
*Assistant Examiner*—Mohsin Benghuzzi

(57) ABSTRACT

A system and method for maintaining a stable synchronization state in a programmable clock synchronizer for effectuating data transfer between first circuitry disposed in a first clock domain and second circuitry disposed in a second clock domain. In a system embodiment, a first circuit portion generates a load signal indicative of a known acceptable state for which a cycle can be loaded. A second circuit portion is in communication with the first circuit portion in order to generate a lock signal indicative of a tolerable tracked skew between a first clock signal of the first clock domain and a second clock signal of the second clock domain. A third circuit portion, responsive to the load signal, the lock signal and a zero skew point indicator, generates a synchronization stable state signal indicative of locking between the first clock signal and the second clock signal.

24 Claims, 7 Drawing Sheets

SYSTEM AND METHOD FOR MAINTAINING A STABLE SYNCHRONIZATION STATE IN A PROGRAMMABLE CLOCK SYNCHRONIZER

PRIORITY UNDER 35 U.S.C. §119(e) & 37 C.F.R. §1.78

This nonprovisional application claims priority based upon the following prior U.S. provisional patent application entitled: "Programmable Clock Synchronizer and controller Arrangement therefor," Application No.: 60/469,120, filed May 9, 2003, in the name(s) of: Richard W. Adkisson, which is hereby incorporated by reference.

CROSS-REFERENCE TO RELATED APPLICATION(S)

This application discloses subject matter related to the subject matter disclosed in the following commonly owned co-pending patent applications: following commonly owned co-pending patent applications: (i) "Programmable Clock Synchronizer," filed Jul. 30, 2003; Application No. 10/630,159, in the name(s) of: Richard W. Adkisson; (ii) "Controller Arrangement for a Programmable Clock Synchronizer," filed Jul. 30, 2003; Application No. 10/630,182, in the name(s) of: Richard W. Adkisson; (iii) "System and Method for Synchronizing Multiple Synchronizer Controllers," filed Jul 30, 2003; Application No. 10/629,989, in the name(s) of: Richard W. Adkisson; (iv) "System and Method for Compensating for Skew between a First Clock Signal and a Second Clock Signal," filed Jul. 30, 2003; Application no. 10/630,317, in the name(s) of: Richard W. Adkisson; and (v) "Phase Detector for a Programmable Clock Synchronizer," filed Jul. 30, 2003; Application No. 10/630,298, in the name(s) of: Richard W. Adkisson, all of which are incorporated by reference herein.

BACKGROUND

Digital electronic systems, e.g., computer systems, often need to communicate using different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the logic circuitry disposed thereon) may be clocked using timing signals derived from the master clock wherein the derived frequencies ($F_D$) follow the relationship: $F_C/F_D \geq 1$.

Because of the asynchronous—although related—nature of the constituent digital circuit portions, synchronizer circuitry is often used in computer systems to synchronize data transfer operations across a clock domain boundary so as to avoid timing-related data errors. Such synchronizer circuitry is typically required to possess low latency (which necessitates precise control of the asynchronous clocks that respectively clock the circuit portions in two different clock domains). Typically, phase-locked loops (PLLs) are utilized in conventional synchronizer circuitry arrangements to produce clocks of different yet related frequencies. The PLLs may have a large amount of input/output (I/O) jitter that results in low frequency phase difference, or skew, between different clocks of the synchronizer circuitry. Accordingly, it is essential to maintain a stable synchronization state in synchronizer circuitry experiencing skew.

SUMMARY

A system and method are disclosed that provide for maintaining a stable synchronization state in a programmable clock synchronizer for effectuating data transfer between first circuitry disposed in a first clock domain and second circuitry disposed in a second clock domain. In a system embodiment, a first circuit portion generates a load signal indicative of a known acceptable state for which a cycle can be loaded. A second circuit portion is in communication with the first circuit portion in order to generate a lock signal indicative of a tolerable tracked skew between a first clock signal of the first clock domain and a second clock signal of the second clock domain. A third circuit portion, responsive to the load signal, the lock signal and a zero skew point indicator, generates a synchronization stable state signal indicative of locking between the first clock signal and the second clock signal.

DETAILED DESCRIPTION OF THE DRAWINGS

Figure 1:
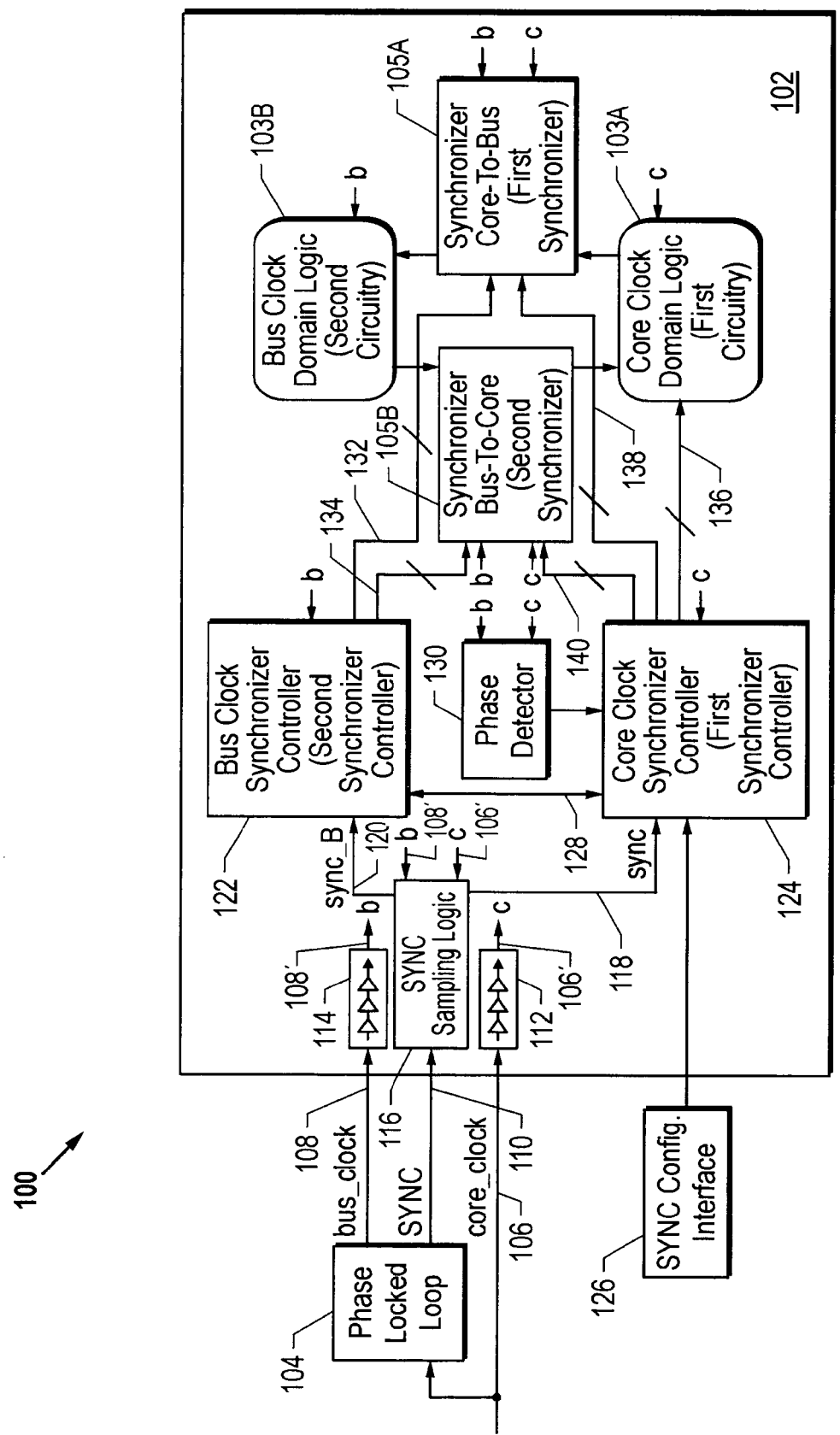
FIG. 1 depicts a block diagram of an embodiment of a programmable synchronizer system for effectuating data transfer across a clock boundary.

In the drawings, like or similar elements are designated with identical reference numerals throughout the several views thereof, and the various elements depicted are not necessarily drawn to scale. Referring now to FIG. 1, therein is depicted an embodiment of a programmable synchronizer system 100 for effectuating data transfer across a clock boundary between a first clock domain (i.e., "fast clock domain") having N clock cycles and a second clock domain (e.g., "slow clock domain") having M clock cycles such that N/M>1. Typically, M=(N−1), and by way of exemplary implementation, the synchronizer system 100 may be provided as part of a computer system for transferring data between a faster core clock domain (e.g., operating with a core clock signal of 250 MHz) and a slower bus clock domain (e.g., operating with a bus clock signal of 200 MHz), with a 5:4 frequency ratio. Accordingly, for purposes of this present patent application, the terms "first clock" and "core clock" will be used synonymously with respect to a fast clock domain; likewise, the terms "second clock" and "bus clock" will be used with respect to a slow clock domain.

A phase-locked loop (PLL) circuit 104 is operable to generate a SYNC pulse 110 and a bus clock (i.e., second clock) signal 108 (designated as bus_clock) based on a core clock (i.e., first clock) signal 106 (designated as core_clock) provided thereto. As will be seen below, the SYNC pulse 110 provides a reference point for coordinating data transfer operations and is driven HIGH when the bus_clock and core_clock signals have coincident rising edges. The two clock signals 106, 108 and SYNC pulse 110 are provided to a synchronizer/controller block 102 that straddles the clock boundary between a first clock domain (i.e., core clock domain) and a second clock domain (i.e., bus clock domain) for effectuating data transfer across the boundary. Reference numerals 103A and 103B refer to circuitry disposed in the first and second clock domains, respectively, e.g., core clock domain logic and bus clock domain logic, that transmit and receive data therebetween as facilitated via synchronizers 105A and 105B, which will be described in greater detail hereinbelow.

Each of the core_clock and bus_clock signals 106, 108 is first provided to a respective clock distribution tree block for generating a distributed clock signal that is provided to various parts of the synchronizer/controller block 102. Reference numeral 112 refers to the clock distribution tree operable with the core_clock signal 106 to generate the distributed core_clock signal, which is labeled as "c" and shown with reference numeral 106' in FIG. 1. Likewise, reference numeral 114 refers to the clock distribution tree 114 operable with the bus_clock signal 108 to generate the distributed bus_clock signal, which is labeled as "b" and shown with reference numeral 108' in FIG. 1. As one skilled in the art should readily recognize, the distributed clock signals are essentially the same as the input clock signals. Accordingly, the core_clock signal 106 and its distributed counterpart c 106' are treated equivalently hereinafter. Also, the bus_clock signal 108 and its distributed counterpart b 108' are similarly treated as equivalent.

A SYNC sampling logic block 116 is operable responsive to the distributed clock signals 106', 108' and SYNC pulse signal 110, to generate a pair of sampled SYNC pulses that are forwarded to appropriate synchronizer controller circuitry. In one embodiment, the sampled SYNC pulses are manufactured as follows. The SYNC pulse 110 is sampled twice by two flip flop (FF) elements (not shown in FIG. 1) that are clocked on the rising edge of the distributed core__clock, c 106'. As may be appreciated, sampling by two FF elements is effective in eliminating metastability associated with the SYNC pulse 110 (possibly arising due to the skew between the input signal, core_clock 106 and the output signal, SYNC 110). The twice-sampled SYNC pulse is designated as "sync" signal 118 in FIG. 1, which is provided to a first synchronizer controller (or, core clock synchronizer controller) 124 operating in the first clock domain.

With respect to the second clock domain (i.e., bus clock domain), the SYNC pulse 110 is sampled in the SYNC sampling logic block 116 by a single FF element (not shown in this FIG.) that is clocked on the rising edge of the distributed bus_clock, b 108'. To signify that the sampling is done using the bus_clock, the sampled SYNC pulse is designated as "sync_B" signal 120, which is provided to a second synchronizer controller 122 operating in the second clock domain, also referred to as the bus clock synchronizer controller in FIG. 1.

The bus clock synchronizer controller 122 is operable responsive to the distributed bus_clock, b 108', and sampled sync_B pulse 120 to generate a plurality of synchronizer control signals, a portion of which signals are directed to a first synchronizer circuit means 105A operating to control data transfer from first circuitry 103A (i.e., core clock domain logic) to second circuitry 103B (i.e., bus clock domain logic). Reference numeral 132 refers to the signal path of this portion of control signals emanating from the bus clock synchronizer controller 122. Another portion of the synchronizer control signals generated by the bus clock synchronizer controller 122 are directed (via signal path 134) to a second synchronizer circuit means 105B operating to control data transfer from second circuitry 103B to first circuitry 103A. Consistent with the nomenclature used in the present patent application, the first and second synchronizer circuits may also be referred to as core-to-bus synchronizer and bus-to-core synchronizer circuits, respectively. In addition, the bus clock synchronizer controller 122 also generates a set of inter-controller control signals that are provided to the first synchronizer controller 124 (i.e., core clock synchronizer controller) such that both controllers can work together. Reference numeral 128 refers to the signal path of the inter-controller clock relationship control signal(s) provided to the core clock synchronizer controller 124.

Similar to the operation of the bus clock synchronizer controller 122, the core clock synchronizer controller 124 is operable responsive to the distributed core_clock, c 106', inter-controller control signals and sampled sync pulse 118 to generate a plurality of synchronizer control signals, a portion of which signals are directed to the first synchronizer circuit means 105A and another portion of which signals are directed to the second synchronizer circuit means 105B. Reference numerals 138 and 140 refer to the respective signal paths relating to these control signals. The core clock synchronizer controller 124 also generates data transmit/ receive control signals that are provided to the core clock domain logic 103A via signal path 136 in order that the core clock domain logic 103A knows when it can send data to the bus clock domain logic 103B (i.e., valid TX operations) and when it can receive data from the bus clock domain logic 103B (i.e., valid RX operations).

All control signals from the bus clock synchronizer controller 122 to the first and second synchronizers 105A, 105B are staged through one or more FF elements that are clocked with the distributed bus_clock, b 108'. Likewise, the control signals from the core clock synchronizer controller 124 are staged through a number of FF elements clocked with the distributed core_clock, c 106', before being provided to the various parts of the synchronizer system 100. Accordingly, as will be seen in greater detail below, the various control signals associated with the synchronizer system 100 may be designated with a signal label that is concatenated with a "_ff" or "_ff_B" suffix to indicate the registration process by the distributed core_clock or the distributed bus_clock.

A phase detector 130 detects phase differences (i.e., skew) between the two clock signals by operating responsive to the sampled bus_clock and core_clock signals. This information is provided to the core clock synchronizer controller 124, which can compensate for the skew or determine appropriate times to coordinate with the bus clock synchronizer controller 122.

Where the bus clock signal is stable with respect to the SYNC pulse, the inter-controller clock relationship control signals are generated by the bus clock synchronizer controller 122 that provide information as to the frequency ratio of the first and second clock signals, clock sequence information and SYNC delay, which are transmitted to the core clock synchronizer controller 124 for synchronizing its core clock signal in accordance therewith. On the other hand, where the core clock signal is stable with respect to the SYNC pulse, the inter-controller clock relationship control signals are generated by the core clock synchronizer controller 124 for transmission to the bus clock synchronizer controller 122 so that both synchronizer controllers may be appropriately synchronized. Further, a configuration interface 126, labeled as SYNC_Config in FIG. 1, is provided as part of the programmable synchronizer system 100 for configuring the core clock synchronizer controller 124 so that it may be programmed for different skew tolerances, latencies and modes of operation. In one embodiment, the configuration interface 126 may be implemented as a register having a plurality of bits. In another embodiment, a memory-based setting, e.g., EPROM-stored settings, may be provided as a SYNC configuration interface.

Additional details regarding the various sub-systems described hereinabove may be found in the following commonly owned co-pending patent applications: (i) "Programmable Clock Synchronizer," filed Jul. 30, 2003; Application No. 10/630,159, in the name(s) of: Richard W. Adkisson; (ii) "Controller Arrangement for a Programmable Clock Synchronizer," filed Jul. 30, 2003; Application No. 10/630,182, in the name(s) of: Richard W. Adkisson; (iii) "System and Method for Synchronizing Multiple Synchronizer Controllers," filed Jul. 30, 2003; Application No. 10/629,989, in the name(s) of: Richard W. Adkisson; (iv) "System and Method for Compensating for Skew between a First Clock Signal and a Second Clock Signal," filed Jul. 30, 2003; Application No. 10/630,317, in the name(s) of: Richard W. Adkisson; and (v) "Phase Detector for a Programmable Clock Synchronizer," filed Jul. 30, 2003; Application No. 10/630,298, in the name(s) of: Richard W. Adkisson, all of which are incorporated by reference herein.

As set forth above, the synchronizer system 100 may be programmed for different skew tolerances and latencies, so that data transfer at high speeds can proceed properly even where there is a high skew or requirement of low latency. Further, the synchronizer system 100 can operate with any two clock domains having a ratio of N first clock cycles to M second clock cycles, where N/M≧1. However, due to the periodicity of the clock signals, a particular phase difference (i.e., skew) between them may be treated as identical to any number of skew values that can arise out of signal aliasing. For purposes of illustration, data transfer from the bus clock domain to the core clock domain is set forth in detail hereinbelow for clock domains with a 5:4 frequency ratio.

Figure 2:
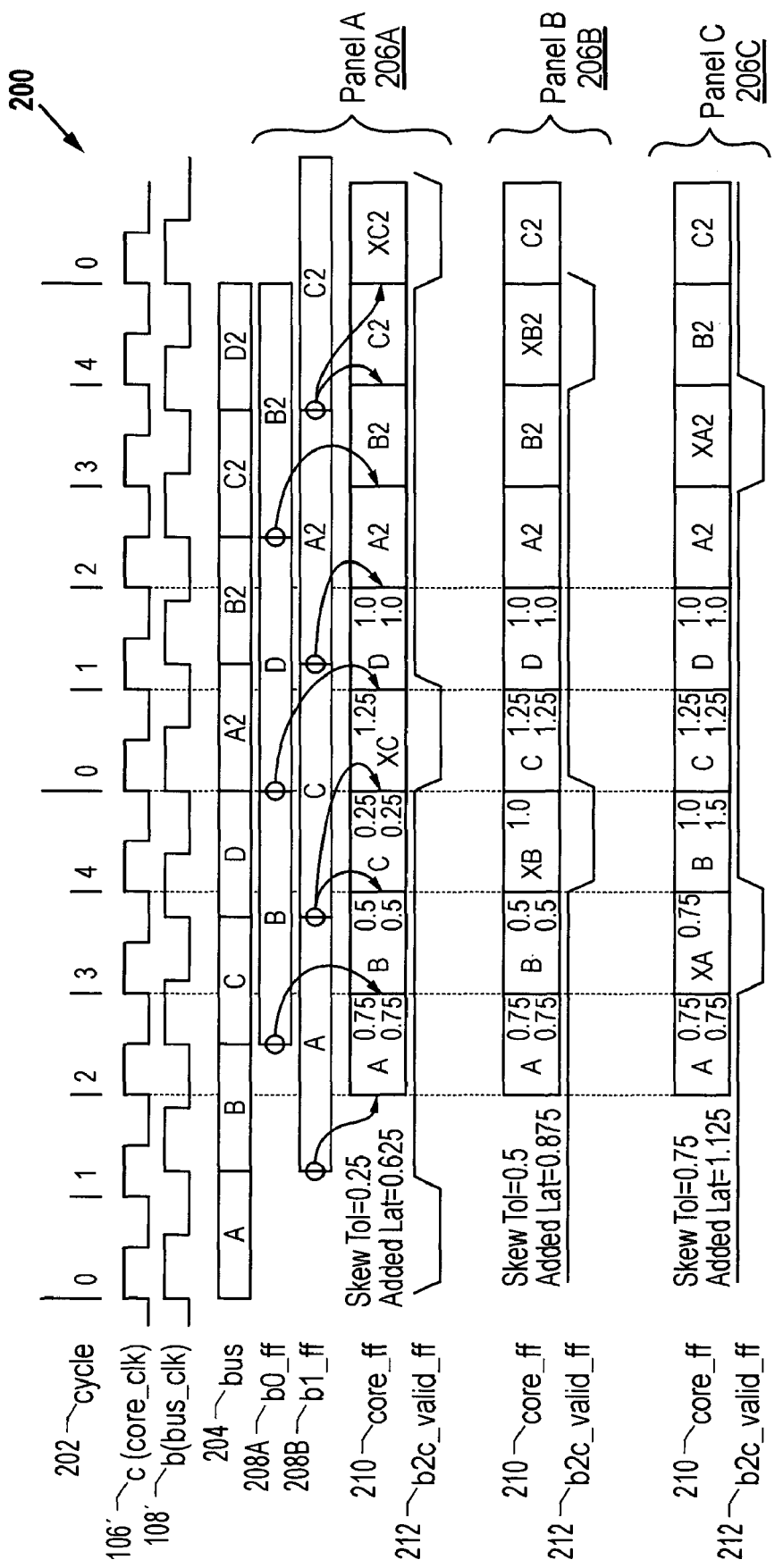
FIG. 2 depicts a timing diagram associated with data transfer from bus clock domain circuitry to core clock domain circuitry, the domains having a 5:4 frequency ratio, wherein the programmable synchronizer system of FIG. 1 may be utilized.

FIG. 2 depicts a timing diagram associated with data transfer from bus clock domain circuitry to core clock domain circuitry, the domains having a 5:4 frequency ratio, wherein the programmable synchronizer system of FIG. 1 may be utilized. In particular, FIG. 2 illustrates the temporal relationship of the various control signals associated with the synchronizer system 100 of FIG. 1 and the effect of different skew tolerances and latencies. A cycle count 202 refers to the numbering of core_clock cycles in a particular timing sequence. Two sequences of bus data 204, [A,B,C,D] and [A2,B2,C2,D2], are exemplified, each block being k-bit wide and available for a particular bus_clock cycle, 0 through 3. Different skew tolerances and latency factors may be programmed and, in a 5:4 mode, for example, a multiplexer register block of a bus-to-core synchronizer circuit (not illustrated) that is clocked by the core_clock may capture data five times but since only four data transfers can come from the bus domain, only four will be used (the extra cycle having an unused data portion, marked with an X in the Panels 206A-206C). Further details regarding the data loading and capture control functionality of an exemplary bus-to-core synchronizer circuit maybe found in the aforementioned co-pending U.S. patent application entitled "Programmable Clock Synchronizer," filed Jul. 30, 2003; Application No. 10/630,159, in the name(s) of: Richard W. Adkisson.

In Panel A 206A, data transfer from the bus domain circuitry, bus data being loaded via a pair of multiplexer-register blocks to be provided as data b0_ff 208A and b1_ff 208B, to the core domain circuitry, as captured data output core_ff 210, is shown where a condition involving a skew tolerance of 0.25 and added latency of 0.625 is programmed. Skew tolerance, which is measured in core clock cycles in this case, is defined as the minimum distance between data sample (i.e., core_ff 210) and changing data input (i.e., b0_ff 208A or b1_ff 208B). Added latency is also measured in core clock cycles, obtained by averaging the values associated with the four data blocks (from start of data input, i.e., b0_ff or b1_ff to core_ff). Actual latency is determined as one bus_clock cycle plus the added latency, which in the 5:4 mode translates to 1.25 core_clock cycles plus the added latency.

As shown in Panel A 206A, which exemplifies the best latency condition but with the worst skew tolerance, the core clock synchronizer controller 124 generates the b2c_valid_ff 212 signal such that there is no valid RX operation on cycle 0 of the core_clock (i.e., its first cycle). The output, i.e., core_ff 210, includes data block [A] from b1_ff 208B, then data block [B] from b0_ff 208A, then data block [C] from b1_ff 208B, and then data block [C] again (in cycle 0 of the core_clock's second sequence, which is the extra cycle unused, hence giving rise to the invalid C or XC data block), and finally, data block [D] from b0_ff 208A. Since the valid [C] block was loaded into the core_ff 210 from b1_ff 208B 0.25 core_clock cycles after b1_ff 208B loaded it, the skew tolerance is 0.25 core_clock cycles.

Panel B 206B of FIG. 2 exemplifies the programming mode with the next best latency condition (added latency=0.875) which has the next best skew tolerance (=0.5 core_clock cycles). Under these conditions, the core clock synchronizer controller 124 generates b2c_valid_ff 212 such that it is driven LOW in the fifth core_clock cycle (i.e., cycle 4). The output, i.e., core_ff 210, includes data block [A] from b1_ff 208B, then data block [B] from b0_ff 208A, and again data block [B] that is not used (in cycle 4 of the core_clock's first sequence, which is the extra cycle unused, hence giving rise to the invalid B or XB data block), then data block [C] from b1_ff 208B, and finally, data block [D] from b0_ff 208A. Since the valid [B] block was loaded into core_ff 210 from b0_ff 208A 0.5 core_clock cycles after it appeared on b0_ff 208A, the skew tolerance is 0.5 core__clock cycles.

The programming mode with the worst latency (=1.125) and the best skew tolerance (=0.75 of core_clock cycles) is shown in Panel C 206C of FIG. 2. The core clock synchronizer controller 124 generates b2c_valid_ff 212 such that it is driven LOW in the fourth core_clock cycle (i.e., cycle 3). The output, i.e., core_ff 210, includes block [A] from b1_ff 208B (in cycle 2 of the core_clock's first sequence), and again data block [A] that is not used (in cycle 3 of the core_clock's first sequence, which is the extra cycle unused, hence giving rise to the invalid A or XA data block), and then data block [B] from b0_ff 208A, then data block [C] from b1_ff 208B, and finally, data block [D] from b0_ff 208A. Since the valid [A] block was loaded into core_ff 210 from b1_ff 208A 0.75 core_clock cycles after it appeared on b1_ff 208A, the skew tolerance is 0.75 core_clock cycles. As pointed out earlier, the added latency is the average of the time (in core_clock cycles) from b0_ff or b1_ff to core_ff for all used data. Accordingly, no latency value is shown in any data portion with an X.

Based on the foregoing discussion, it should be appreciated that the synchronizer embodiment of the present invention may be programmed for different latencies and skew tolerances for transferring data across a clock boundary between any two clock domains having a known N:M ratio (e.g., M=N-1). It should be recognized, however, that for particular skew tolerances and latencies, the stability of the synchronization state may become disrupted. For example, in instances of a 5:4 ratio wherein a skew tolerance=0.75 is selected, a skew of 0.75 is identical to a skew of −0.25. Accordingly, if the controller locks to the −0.25 skew, but the core clock lagged the bus clock by 0.75, then when the core clock returns to align with the bus clock, the controller will go from −0.25 to −1.0 and be out of range, thereby disrupting the stable synchronization state. The teachings disclosed herein maintain a stable synchronization state by providing that the skew is near zero before locking so that the entire range of skew tolerances (even beyond±one half core_clock cycle) can be programmed.

Figure 3:
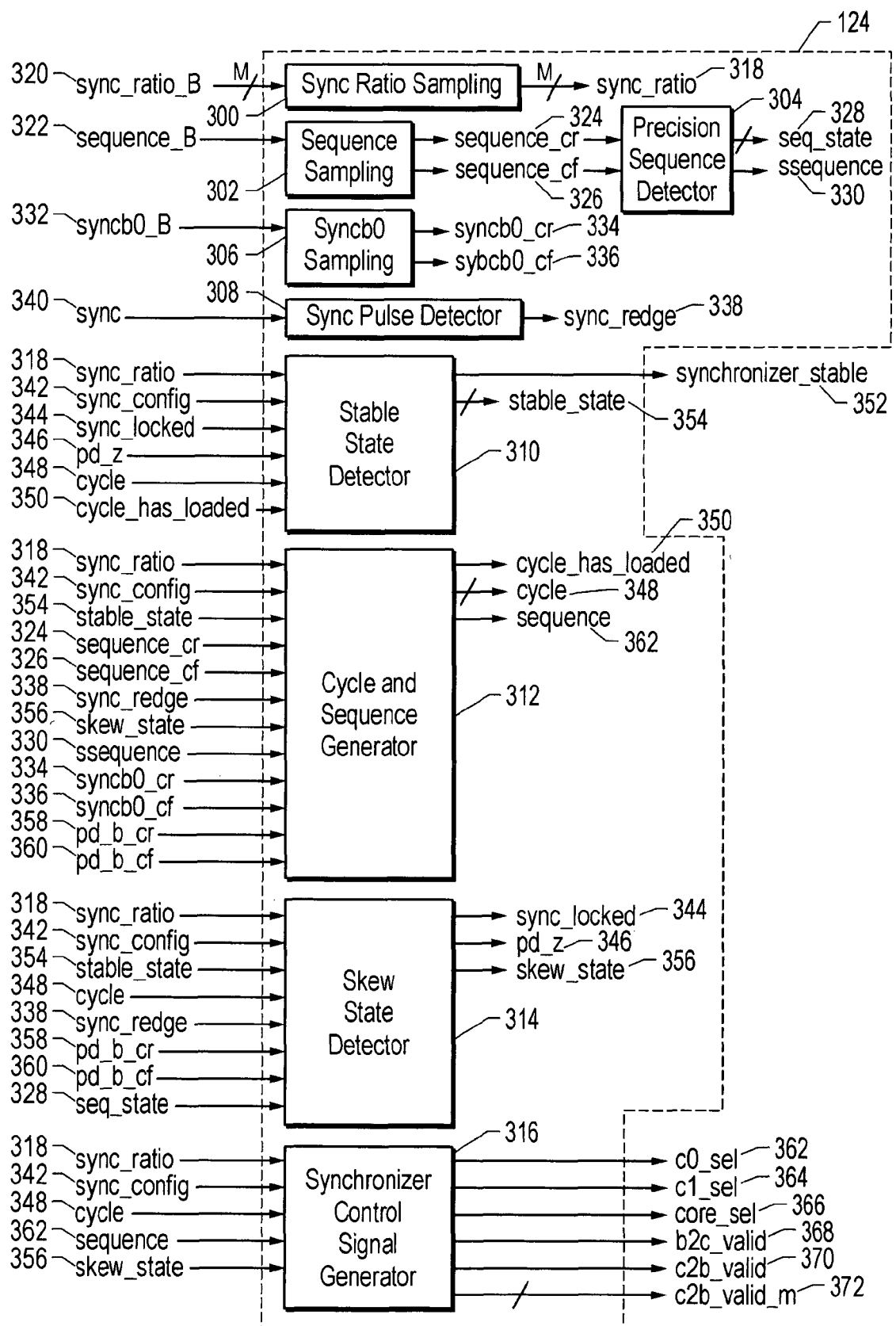
FIG. 3 depicts a block diagram of an embodiment of a core clock synchronizer controller for effectuating data transfer across a clock boundary.

FIG. 3 depicts a block diagram of an embodiment of the core clock synchronizer controller 124 for effectuating data transfer across a clock boundary. The core clock synchronizer controller 124 comprises several interconnected logic components including a synchronizer (sync) ratio sampling block 300, a sequence sampling block 302, a precision sequence detector block 304, a syncb0 sampling block 306, a synchronizer pulse detector block 308, a stable state detector block 310, a cycle and sequence generator block 312, a skew state detector block 314, and a synchronizer control signal generator block 316. As set forth in additional detail in the co-pending U.S. patent application entitled "Controller Arrangement for a Programmable Clock Synchronizer," filed Jul. 30, 2003; Application No. 10/630,182, in the name(s) of: Richard W. Adkisson, various inter-controller clock relationship control signals, namely, sync_ratio_B 320, sequence_B 322 and syncb0_B 332, are provided as inputs to the core clock synchronizer controller circuitry from the corresponding bus clock synchronizer controller. As discussed further therein, these inter-controller clock relationship control signals are used in conjunction with synchronization configuration information provided via SYNC configuration interface 126 (shown in FIG. 1) to manufacture additional internal control signals within the core clock synchronizer controller for effectuating the functionality of the various constituent modules thereof. Accordingly, only certain salient features of the core clock synchronizer controller 124 will now be described.

The synchronizer ratio sampling block 300 is operable to generate an M-bit wide sync_ratio signal 318 by sampling M-bit wide sync_ratio_B signals 320 from the bus block domain. The sequence sampling block 302 samples the sequence_B signal 322 on the rising edge of the core clock to produce a sequence_cr signal 324. Additionally, the sequence sampling block 302 samples the sequence_B signal 322 on the falling edge of the core clock to produce a sequence_cf signal 326. The precision sequence detector 304 generates a seq_state signal 328 and a ssequence signal 330 in response to the sequence_cr signal 324 and sequence_cf signal 326. The core clock synchronizer controller 124 synchronizes a syncb0_B signal 332 using the syncb0 sampling block 306 which produces a syncb0_cr signal 334 and a syncb0_cf signal 336 by employing a similar sampling technique. The synchronization pulse detector block 308 generates a sync_redge signal 338 in response to a sync signal 340, e.g., sync 118 provided by the SYNC sampling logic 116 (shown in FIG. 1).

As will be discussed in more detail hereinbelow, the core clock synchronizer controller 124 employs the precision sequence detector 304, the stable state detector 310, cycle and sequence generator 312, and skew state detector 314 to provide use of the entire skew range on modes where the skew tolerance is greater than one half core clock and the skew between the bus and core clocks cannot be counted on to be below one half core clock initially. The stable state detector block 310 receives the sync_ratio signal 318 provided by the synchronizer ratio sampling block 300, a sync_config signal 342 provided via the synchronizer configuration interface 126 of FIG. 1, a sync_locked signal 344 and a pd_z signal 346 provided by the skew state detector block 314, and a cycle signal 348 and a cycle_has_loaded signal 350 provided by the cycle and sequence generator 312. Based on the aforementioned input signals, the stable state detector block 310 generates a synchronizer_stable signal 352 which may be transmitted to the core clock domain logic circuitry 103A (shown in FIG. 1). A stable_state signal 354 is also generated which is used internally for generating other internal control signals of the core clock synchronizer controller circuitry.

The cycle and sequence generator block 312 receives the sync_ratio signal 318 from the synchronizer ratio sampling block 300, the sync_config signal 342 from the synchronizer configuration interface 126 of FIG. 1, the stable_state signal 354 from the stable state detector block 310, the sequence_cr and sequence_cf signals 324 and 326 from the sequence sampling block 302, the sync_redge signal 338 from the synchronizer pulse detector block 308, a skew_state signal 356 from the skew state detector block 314, the ssequnce signal 330 from the precision sequence detector block 304, the syncb0_cr and syncb0_cf signals 334 and 336 from the syncb0 sampling block 306, and pd_b_cr and pd_b_cf signals 358 and 360 from the phase detector block 130 of FIG. 1. In response to the input signals, the cycle and sequence generator 312 asserts the cycle_has_loaded signal 350, the cycle signal 348, and a sequence signal 362.

As illustrated, the skew state detector 314 receives the sync_ratio signal 318 from the synchronizer ratio sampling block 300, the sync_config signal 342 from the synchronizer configuration interface block 126 of FIG. 1, the stable_state signal 354 from the stable state detector 310, the cycle signal 348 from the cycle and sequence generator 312, the sync_redge signal 338 from the synchronizer pulse detector 308, the pd_b_cr and pd_b_cf signals 358 and 360 from the phase detector 130 of FIG. 1, and the seq_state signal 328 from the precision sequence detector 304. In response to the received signals, the skew state detector 314 asserts the sync_locked signal 344, the pd_z signal 346, and the skew_state signal 356.

The synchronizer control signal generator block 316 receives the sync_ratio signal 318 from the synchronizer ratio sampling block 300, the sync_config signal 342 from the synchronizer configuration interface 126, the cycle and sequence signals 348 and 362 from the cycle and sequence generator block 312, and the skew_state signal 356 from the skew state detector block 314. In response to the input signals, the synchronizer control signal generator block 312 asserts a c0_sel signal 362, a c1_sel signal 364, a core_sel signal 366, a b2c_valid signal 368, a c2b_valid signal 370, and a c2b_valid_m signal 372. Further details regarding signals 362-372 may be found in the aforementioned co-pending U.S. patent application entitled "Controller Arrangement for a Programmable Clock Synchronizer," filed Jul. 30, 2003; Application No. 10/630,182, in the name(s) of: Richard W. Adkisson.

Figure 4:
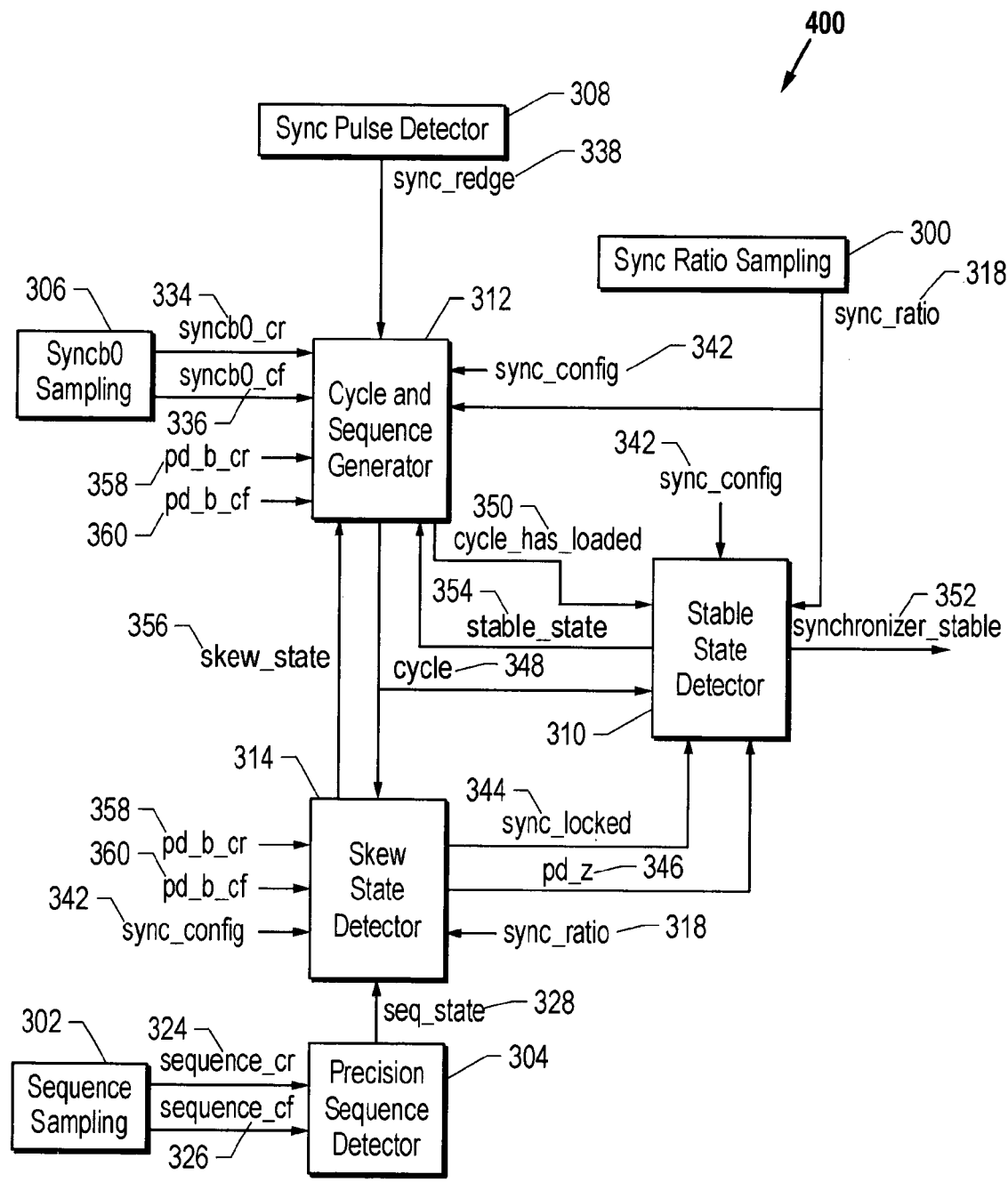
FIG. 4 depicts a block diagram of a portion of the core clock synchronizer controller of FIG. 3 that illustrates in further detail one embodiment of a system for maintaining a stable synchronization state.

FIG. 4 depicts a logic portion 400 of the core clock synchronizer controller 124 of FIG. 3 in order to highlight in further detail one embodiment of a system for maintaining a stable synchronization state. In particular, the sync_config signal 342 defines various modes, i.e., an infinity mode, a non-wait-for-zero mode, a 1:1 wait-for-zero mode, and a N:M wait-for-zero mode, that in turn define the signal functioning between the cycle and sequence generator, skew state detector, and the stable state detector. The cycle and sequence generator block 312, i.e., a first circuit portion, generates a load signal, i.e., the cycle_has_loaded signal 350, indicative of a known acceptable state for which a cycle may be loaded. The skew state detector block 314, i.e., a second circuit portion, positioned in communication with the cycle and sequence generator block 312 generates a lock signal, i.e., the sync_locked signal 344, indicative of the presence of a tolerable tracked skew between the clock domains. The stable state detector block 310, i.e., a third circuit portion, responsive to the load signal, the lock signal and a zero skew point indicator signal, generates a synchronization stable state signal, i.e., the synchronizer_stable signal 352, indicative of locking between the clock domain signals. In one embodiment, the stable state detector determines the zero skew point indicator signal by ANDing the cycle signal 348 and the pd_z signal 346. By ensuring that near zero skew is present prior to generating a synchronization stable state signal, the teachings described herein maintain a stable synchronization state in synchronizer circuitry experiencing skew.

More particularly, when the sync_config signal 342 is in a non-infinity mode, the cycle and sequence generator block 312 loads the cycle and asserts the cycle_has_loaded signal 350 based on the sync_redge signal 388 from the synchronizer pulse detector block 308 and the stable_state signal 354 from the stable state detector block 310. When the sync_redge signal 388 is asserted and the stable_state signal 354 is zero, the expected cycle is loaded and the cycle_has_loaded signal 350 is asserted. If the stable_state signal is not zero, however, the cycle is not loaded and a zero is loaded on the last cycle or the cycle is incremented.

The cycle and sequence generator block 312 operates slightly differently when the sync_config signal 342 is in an infinity mode. The infinity mode allows an entire core clock period of skew to occur by transitioning the skew state back to its original position. In this manner, an arbitrarily large and potentially infinite amount of skew may be tracked and compensated for. In the infinity mode, instead of using the sync_redge signal 338 to load the expected cycle, a combination of the sync_redge signal 338, syncb0_cr signal 334, the syncb0_cr signal 336 and additional phase detector signaling in the form of the pd_b_cr signal 358 and the pd_b_cf signal 360 is employed to load the cycle at a known good point indicative of an expected and compensated cycle. Known good points include all points around zero that cannot alias to another location, for example, X+/−⅜ core clock cycles for the 5:4 ratio where X is any integer.

The skew state detector block 314 determines the skew_state signal 356 necessary to compensate the skew between the bus clock and the core clock. Particular information relevant to the skew state detector may be found in the aforementioned co-pending U.S. patent application entitled "System and Method Compensating for Skew between a First Clock Signal and a Second Clock Signal," filed Jul. 30, 2003; Application No. 10/630,317, in the name(s) of: Richard W. Adkisson. The skew state detector bock 314 determines the skew_state signal 356 and asserts the sync_locked signal 344 as will be discussed in more detail hereinbelow. For example, in a 1:1 wait-for-zero mode, a precision sequence detector may be employed to detect the coincident bus and core clock rising edges at a deemed zero point in its reference space. By way of another example, in an infinity mode, the skew state detector block 314 asserts the pd_z signal 346 when the phase detector 130 of FIG. 1 detects coincident bus and core clock rising edges at a deemed zero point in its reference space. The synchronizer pulse detector 308 indicates the position of the coincident edges via the sync_redge signal 338 which is used by the cycle and sequence generator block 312 for manufacturing the cycle signal 348, among others. In particular, the assertion of the sync_locked signal 344 depends on the assertion of the pd_z signal which depends on the pb_b_cr signal 358 and the pb_b_cf signal 360 asserted by the phase detector block 130 of FIG. 1.

With the sync_config signal 342 set to infinity mode, the pd_z signal 346 is active when the skew is compensated for with the skew_state signal 356. For example, if the skew_state signal 356 is Z and the core clock lags the bus clock too much, the pd_z signal 346 will go inactive until the skew_state signal 356 goes to P1 in which case pd_z becomes active because the phase detector block's coincident edge matches the skew state's expected location.

Additionally, when first detecting the correct phase, the skew state detector block 314 cannot initially use the phase detector block 130 of FIG. 1 since aliasing is possible. For example, in the 5:4 ratio the core lagging the bus by one quarter core clock is identical to the core leading the bus by three quarters core clock. Thus initially, when the stable_state signal 354 is not fully asserted (stable_state signal<3 in FIG. 6), the change (plus or minus) in state is only detected on a cycle when the synchronizer pulse detector block 308 detects the edge and the phase detector block 130 detects a change, or if the synchronizer pulse detector block 308 detects the edge has moved to another clock period. After the signal is locked, the change, plus or minus, is detected on cycle 0 if the phase detector block detects a change or if the synchronizer pulse detector block detects a gross edge movement (two clocks).

As alluded to, the phase detector cannot be used to detect skew states in a synchronous timing configuration, i.e., involving a 1:1 frequency ratio, i.e., a 1:1 wait-for-zero mode, for the clock domains. Instead, the precision sequence detector block 304 is employed to determine when the signal is locked for instances of synchronous clock domains. As will be explained in further detail in FIG. 7, the precision sequence detector block 304 repeatedly samples the rising and falling edges of the core clock via the sequence_cr signal 324 and the sequence_cf signal 326 provided by the sequence sampling block 302 to determine the sequence state of the system 100. Once the sequence state is determined to be the state Z, which is indicative of synchronization lock, the sequence state is asserted as the seq_state signal 328 to the skew state detector block 314. Following the assertion of the seq_state=Z signal, the sync_locked signal 344 may be asserted.

In one embodiment, independently of the particular sync_config signal 342, the stable state detector block 310 asserts the synchronizer_stable signal 352 to the core clock logic domain 103A upon receiving the cycle_has_loaded signal 350 and the sync_locked signal 344 and a zero skew point indication. As discussed, the synchronizer_stable signal 352 provides a stable synchronization state despite the presence of skew. In particular, the system and method set forth herein maintain a stable synchronization state by locking synchronization at a zero skew point wherein the clock domains have coincident rising edges in the presence of a tolerable skew. It should be appreciated that tolerable skew will depend on various characteristics of the system including the skew tolerance and the clock domain mode. For instance, in a 5:4 clock domain, +/−⅛ clock cycles is an example of a tolerable skew.

Figure 5:
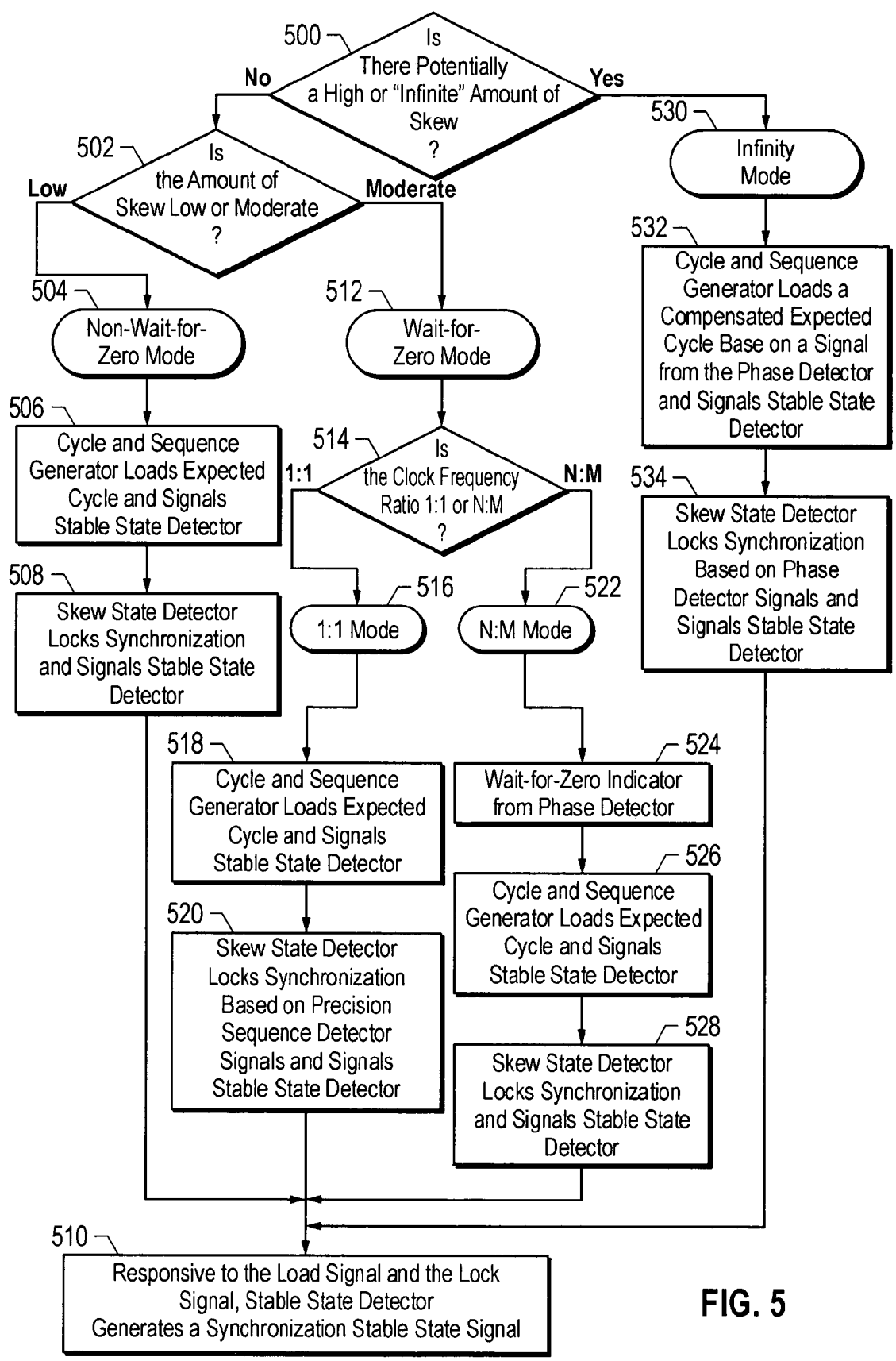
FIG. 5 depicts a flow chart of one embodiment of a method for maintaining a stable synchronization state.

FIG. 5 depicts one embodiment of a method for maintaining a stable synchronization state. More specifically, FIG. 5 illustrates four modes of operation that the present system may adopt to maintain a stable synchronization state. For example, as will be explained in further detail below, the system may adopt a non-infinity, non-wait-for-zero mode if the system is experiencing low skew, e.g., less than 0.5 clock cycles. The system may adopt either a non-infinity, wait-for-zero 1:1 clock frequency ratio mode or a non-infinity, wait-for-zero N:M clock frequency ratio mode if the system is experiencing moderate skew, e.g., between about 0.5 and 1.0 clock cycle. Alternatively, an infinity, wait-for-zero mode may be adopted if the system is experiencing high or potentially infinite skew. Each mode as asserted via the sync-config signal 342 defines signal functionality between the cycle and sequence generator, skew state detector, and the stable state detector.

At decision block 500, if a potentially high or "infinite" amount of skew is present, then the method advances to an infinity mode block 530 which will be described in more detail below. Otherwise, if a high or "infinite" amount of skew is not present between the core clock and the bus clock, then the method advances to decision block 502.

At decision block 502, if the amount of skew is moderate, then the method advances to a wait-for-zero block 512. If the amount of skew is low, however, the method advances to block 504 wherein the system is in a non-wait-for-zero mode. In this mode at block 506, the cycle and sequence generator loads the expected cycle and signals the stable state detector that the expected cycle has been loaded. At block 508, the skew state detector locks synchronization and signals the state detector that synchronization has been locked. At block 510, responsive to the load signal and the lock signal, the stable state detector generates a synchronization stable state signal.

Commencing from the wait-for-zero mode block 512, wherein the skew between the core clock signal and the bus clock signal is moderate, a further determination is made. At decision block 514, if the clock frequency ratio is N:M, then the method advances to block 522. Otherwise, the clock frequency ratio is 1:1 and the method advances to block 516 wherein the system is in a 1:1 mode. At block 518, the cycle and sequence generator loads the expected cycle and signals the stable state detector that the cycle has been loaded. At block 520, the skew state detector locks synchronization based on signals received from the precision sequence detector and signals the stable state detector that the signal has been locked. In particular, contrary to the other modes, in the 1:1 wait-for-zero mode, the lock signal is operable as a zero skew point indicator. At block 510, responsive to the load signal and the lock signal, the stable state detector generates a synchronization stable state signal.

Returning to block 522, wherein the clock frequency ratio is N:M and the system is in an N:M mode. At block 524, the stable state detector waits for a zero indication from the phase detector. At block 526, the cycle and sequence generator loads the expected cycle and signals the stable state detector. At block 528, the skew state detector locks synchronization and signals the stable state detector that synchronization has been locked. Again, at block 510, responsive to the load signal and the lock signal, the stable state detector generates a synchronization stable state signal.

Returning to block 530, wherein a potentially high or "infinite" amount of skew is present and the system is in an infinity mode. At block 532, the cycle and sequence generator loads a compensated expected cycle based on a signal from the phase detector and signals the stable state detector. At block 534, the skew state detector locks synchronization based on the phase detector signals and signals the stable state detector that the signal has been locked. Thereafter, the stable state detector generates a synchronization stable state signal at block 510 responsive to the load signal and the lock signal, as pointed out earlier.

Figure 6:
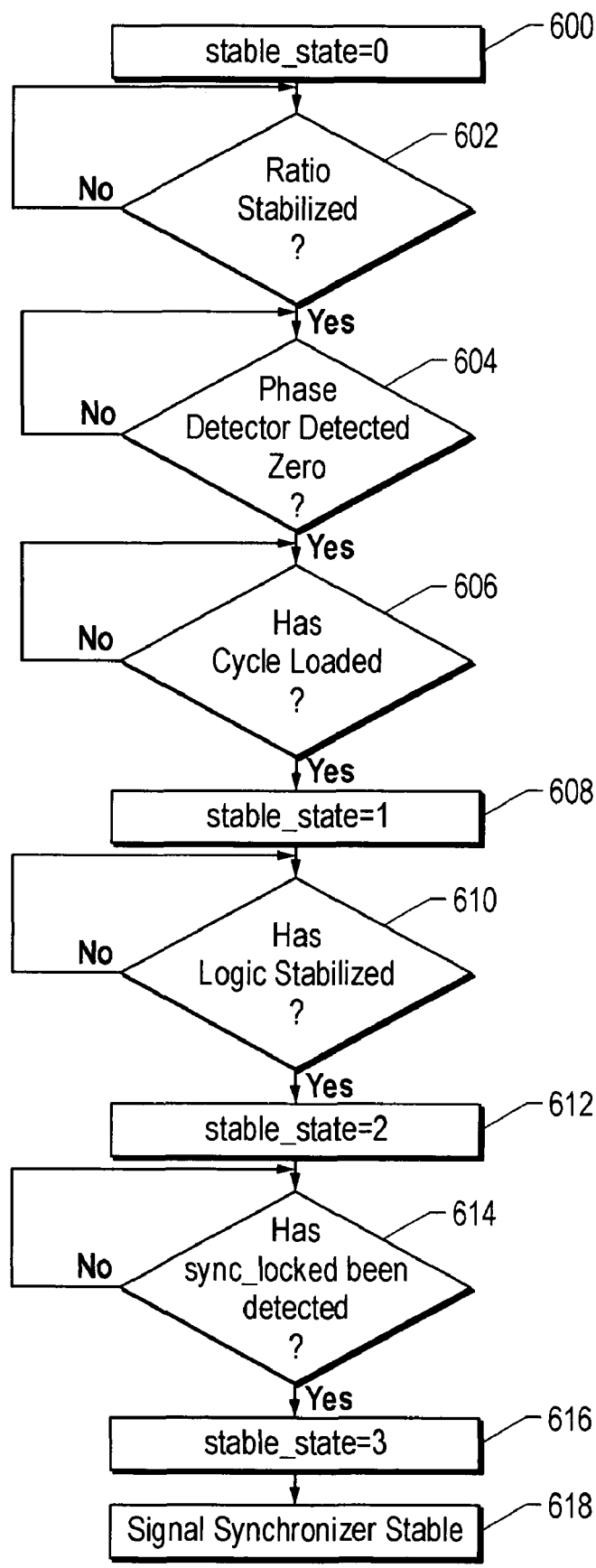
FIG. 6 depicts a flow chart of one embodiment of the functionality effectuated by a stable state detector associated with the system for maintaining a stable synchronization state.

FIG. 6 depicts one embodiment of the functionality effectuated by a stable state detector associated with the system for maintaining a stable synchronization state. By way of example, the illustrated flow chart depicts the various operations effectuated by the stable state detector for clock domains having a 5:4 ratio where the sync_config signal selects the skew tolerance to be in 0.75 mode as described in FIG. 2 and the stable state detector is in an N:M wait-for-zero mode. It should be understood, however, that the operations illustrated in FIG. 6 may be conducted in accordance with any of the modes and signaling functionalities discussed in detail in FIG. 5. At block 600, initially the stable_state signal of the stable state detector is set to zero. At block 602, once the ratio has stabilized, i.e., the sync_ratio signal has remained unchanged for a predetermined period of time, the method advances to block 604. In one embodiment, the predetermined period of time is 24 cycles. At block 604, the stable state detector waits until the phase detector detects a "zero" phase, i.e., the cycle is zero and the pd_z signal is asserted based on the occurrence of coincident core and bus clock rising edges. At block 606, the stable state detector waits for the cycle to load, i.e., the cycle_has_loaded signal to be received from the cycle and sequence generator based on the sync_redge signal 338. At block 608, the stable state detector sets the stable_state signal to 1. At block 610, the stable state detector waits for the logic to stabilize before advancing to block 612 where the stable_state signal is set to 2 at block 612. In one embodiment, the stable state detector may wait for 24 clock periods. At block 614, the stable state detector waits for the sync_locked signal to be received from the skew state detector before setting the stable_state signal to 3 at block 616. At block 618, the synchronizer generates a synchronization stable state signal indicative of locking between the clock signals of the two clock domains.

Figure 7:
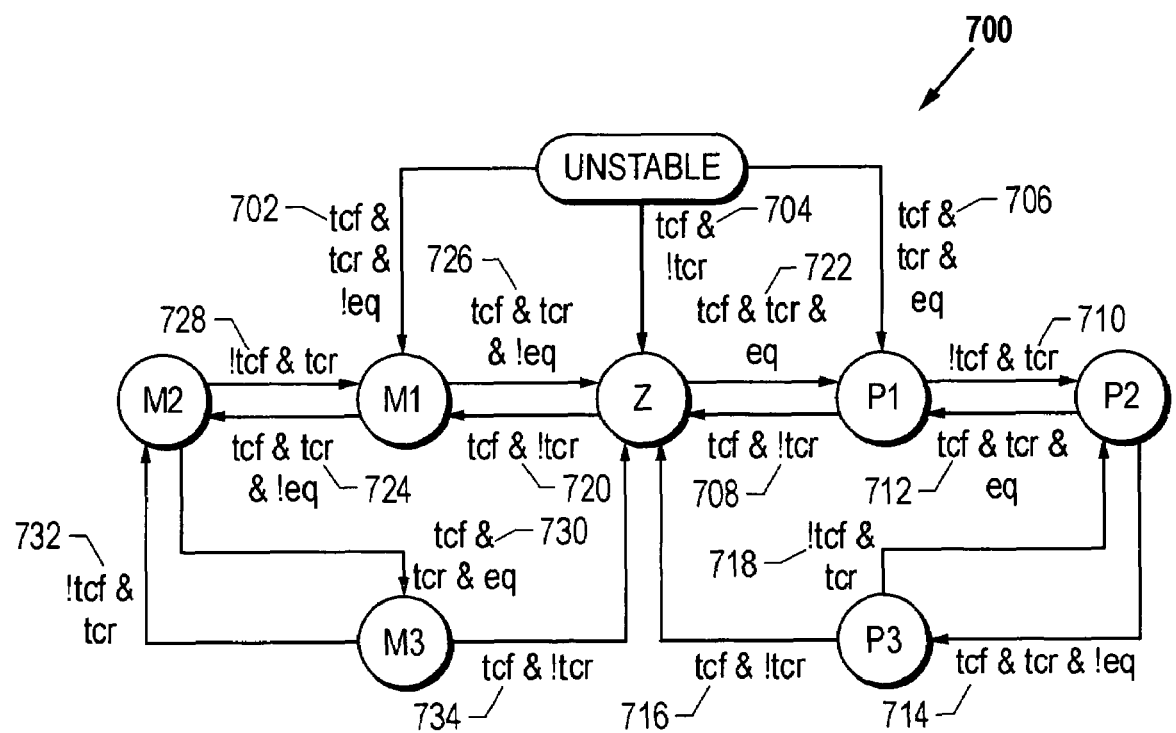
FIG. 7 depicts one embodiment of a state machine effectuated by a precision sequence detector associated with the system for maintaining a stable synchronization state.

FIG. 7 depicts an embodiment of a state transition diagram 700 exemplifying the operations of a precision sequence detector associated with the system for maintaining a stable synchronization state. The precision sequence detector detects changes and tracks changes in the skew between the bus and core clock in a 1:1 mode. As alluded to earlier, if the core to bus ratio is 1:1, the skew tolerance may be one half of one core clock. If the skew stays below +/−½ core clocks initially, then it may have one core clock of skew tolerance. If this is not the case, however, a 1:1 wait-for-zero detector, i.e., a precision sequence detector, is employed since the phase detector may not be used as the phase detector detects differences in the phases and in a 1:1 mode the phases are the same.

Each state, P1, P2, P3, M1, M2, M3, and Z, represents multiples of a quarter core clock skew. In particular, the P1 (plus 1) state represents +¼ clock skew, the P2 (plus 2) state represents +½ clock skew, the P3 (plus 3) state represents +¾ clock skew, the M1 (minus 1) state represents −¼ clock skew, the M2 (minus 2) state represents −½ clock skew, the M3 (minus 3) state represents −¾ clock skew, and the Z (zero) state represents 0 clock skew. The precision sequence detector uses the sequence_cf and sequence_cr signals, which are sampled using the core clock, to determine the transition between states. The "tcf" transition condition, i.e., a trust_cf signal, is indicative that the sequence sampled on the core clock falling edge alternates for four samples. The "tcr" transition condition, i.e., a trust_cr signal, is indicative that the sequence sampled on the core clock rising edge alternates for four samples. The "eq" transition condition, i.e., an eq signal, is indicative that the sequence sampled on the falling edge is the same as the sequence sampled on the rising edge. Similarly, the "!" symbol preceding each condition is indicative of a logic negation of that particular transition condition.

The precision state detector starts out in the UNSTABLE state and upon sampling the sequence_B signal using the rising and falling edges of the core clock, the precision state detector transitions to the M1 state, the Z state or the P1 state. For example, a UM1 (UNSTABLE state to M1 state) transition 702 is characterized by the tcf transition condition, tcr transition condition and !eq transition condition, a UZ (UNSTABLE state to Z state) transition 704 is characterized by the tcf transition condition and the !tcr transition condition, and a UP1 (UNSTABLE state to P1 state) transition 706 is characterized by the tcf transition condition, the tcr transition condition, and the eq transition condition. The following table, Table 1, summarizes the various transitions of the transition state diagram 700:

TABLE 1

Transitions and Transition Conditions of the Transition State Diagram

| Transition | Transition Conditions |
| --- | --- |
| UM1 702 | tcf, tcr, !eq |
| UZ 704 | tcf, !tcr |
| UP1 706 | tcf, tcr, eq |
| P1Z 708 | tcf, !tcr |
| P1P2 710 | !tcf, tcr |
| P2P1 712 | tcf, tcr, eq |
| P2P3 714 | tcf, tcr, !eq |
| P3Z 716 | tcf, !tcr |
| P3P2 718 | !tcf, tcr |
| ZM1 720 | tcf, !tcr |
| ZP1 722 | tcf, tcr, eq |
| M1M2 724 | tcf, tcr, !eq |
| M1Z 726 | tcf, tcr, !eq |
| M2M1 728 | !tcf, tcr |
| M2M3 730 | tcf, tcr, eq |
| M3M2 732 | !tcf, tcr |
| M3Z 734 | tcf, !tcr |

As depicted, the precision sequence detector negotiates the transition state diagram 700 by repeatedly sampling the sequence_B signal using the rising and falling edges of the core clock. Once a transition state is determined, the precision sequence detector outputs the state as the seq_state signal 328 of FIG. 3 and FIG. 4. In particular, upon detecting a stable state of Z, the precision sequence detector has locked and the seq_state signal is asserted as Z.

In one embodiment, the precision sequence detector described herein is effectuated by a series of shift registers. For example, in one embodiment, the sequence_cr signal 324 of FIG. 4 is placed into a shift register and the sequence_cf signal 326 of FIG. 4 is placed into a second shift register. If the sequence_cr signal alternates between zero and one for the length of the shift register, then a trust_cr signal is asserted. If the sequence_cf alternates for the length of the shift register, then a trust_cf signal is asserted. If the sequence_cr signal is equal to the sequence_cf signal, then an eq signal is asserted. It should be appreciated, however, that other arrangements of sequential and combination logic may be employed to effectuate the functions of the precision sequence detector set forth above.

Although the invention has been particularly described with reference to certain illustrations, it is to be understood that the forms of the invention shown and described are to be treated as exemplary embodiments only. Various changes, substitutions and modifications (for instance, by implementing different logic gates and signal logic levels to achieve equivalent functionality) can be realized without departing from the spirit and scope of the invention as defined by the appended claims.

What is claimed is:

1. A system for maintaining a stable synchronization state in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to N second clock cycles, where N/M≧1, comprising:

a first circuit portion operable to generate a load signal indicative of a known acceptable state from which a cycle may be loaded;

a second circuit portion in communication with said first circuit portion, said second circuit portion operating to generate a lock signal indicative of a tolerable tracked skew between said first clock signal and said second clock signal; and a third circuit portion, operating responsive to said load signal, said lock signal, and a zero skew point indicator, for generating a synchronization stable state signal indicative of locking between said first clock signal and said second clock signal, wherein said third circuit portion is operable to transmit said synchronization stable state signal to said first circuitry disposed in said first clock domain.

2. The system as recited in claim 1, further comprising a synchronizer configuration interface in communication with each of said first circuit portion, said second circuit portion and said third circuit portion, wherein said synchronizer configuration interface is operable to provide a configuration signal indicative of a skew tolerance between said first clock signal and second clock signal.

3. The system as recited in claim 1, further comprising a synchronizer configuration interface in communication with each of said first circuit portion, said second circuit portion and said third circuit portion, wherein said synchronizer configuration interface is operable to provide a configuration signal indicative of a latency value with respect to at least one of said first clock signal and said second clock signal.

4. The system as recited in claim 1, wherein said first circuit portion comprises a cycle and sequence generator.

5. The system as recited in claim 1, wherein said first circuit portion generates said load signal in response to a stable state signal (stable_state) generated by said third circuit portion and a synchronous rising edge signal (sync_redge) generated by a synchronizer pulse detector.

6. The system as recited in claim 1, wherein said first circuit portion generates said load signal in response to a stable state signal (stable_state) generated by said third circuit portion, a synchronous rising edge signal (sync_redge) generated by a sync pulse detector, a sampled rising edge signal (syncb0_cr) generated by a sampling block, a sampled falling edge signal (syncb0_cf) signal generated by said sampling block, and phase detection signals (pd_b_cr and pd_b_cf) provided by a phase detector.

7. The system as recited in claim 1, wherein said second circuit portion comprises a skew state detector.

8. The system as recited in claim 1, wherein said lock signal is generated in response to coincident rising edges of said first clock signal and said second clock signal.

9. The system as recited in claim 1, wherein said lock signal is generated in response to a zero sequence state signal (seq_state=Z) provided by a precision sequence detector.

10. The system as recited in claim 1, wherein said third circuit portion comprises a stable state detector.

11. The system as recited in claim 1, wherein said lock signal is operable as a zero skew point indicator in a 1:1 ratio mode wherein said N/M=1.

12. The system as recited in claim 1, wherein said third circuit portion provides said zero skew point indicator by ANDing a cycle signal provided by said first circuit portion and a pd_z signal provided by said second circuit portion.

13. A method for maintaining a stable synchronization state in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where N/M≧1, comprising:
    generating a load signal indicative of a known acceptable state from which a cycle may be loaded;
    generating a lock signal indicative of a tolerable tracked skew between said first clock signal and said second clock signal; and
    responsive to said load signal, said lock signal and a zero skew pint indicator, generating a synchronization stable state signal indicative of locking between said first clock signal and said clock signal, wherein said synchronization stable state signal is provided to said first circuitry disposed in said first clock domain.

14. The method as recited in claim 13, wherein said load signal is generated in response to a stable state signal (stable_state) and a synchronous rising edge signal (sync_redge).

15. The method as recited in claim 13, wherein said load signal is generated in response to a stable state signal (stable_state) generated by said third circuit portion, a synchronous rising edge signal (sync_redge) generated by a sync pulse detector, a sampled rising edge signal (syncb0_cr) generated by a sampling block, a sampled falling edge signal (syncb0_cf) signal generated by said sampling block, and phase detection signals (pd_b_cr and pd_b_cf) provided by a phase detector.

16. The method as recited in claim 13, wherein said lock signal is generated in response to coincident rising edges of said first clock signal and said second clock signal.

17. The method as recited in claim 13, wherein said lock signal is generated in response to a zero sequence state signal (seq_state=Z) provided by a precision sequence detector.

18. The method as recited in claim 13, wherein said zero skew point indicator is provided by ANDing a cycle signal and a pd_z signal.

19. A computer system having an apparatus for maintaining a stable synchronization state in a programmable clock synchronizer used in effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where N/M≧1, comprising:
    a cycle and sequence generator operable to generate a load signal indicative of a known acceptable state from which a cycle may be loaded;
    a skew state detector in communication with said cycle and sequence generator, said skew state detector operating to generate a lock signal indicative of a tolerable treated skew between said first clock signal and said second clock signal; and
    a stable state detector, operating responsive to said load signal, said lock signal and a zero skew point indicator, for generating a synchronization stable state signal indicative of locking between said first clock signal and said second clock signal, wherein said stable state detector is operable to transmit said synchronization stable state signal to said first circuitry disposed in said first clock domain.

20. The computer system as recited in claim 19, wherein said cycle and sequence generator generates said load signal in response to a stable state signal (stable_state) generated by said stable state detector and a synchronous rising edge signal (sync_redge) generated by a synchronizer pulse detector.

21. The computer system as recited in claim 19, wherein said cycle and sequence generator generates said load signal in response to a stable state signal (stable_state) generated by said stable state detector, a synchronous rising edge signal (sync_redge) generated by a sync pulse detector, a sampled rising edge signal (syncb0_cr) generated by a sampling block, a sampled falling edge signal (syncb0_cf) signal generated by said sampling block, and phase detection signals (pd_b_cr and pd_b_cf) provided by a phase detector.

22. The computer system as recited in claim 19, wherein said lock signal is generated in response to coincident rising edges of said first clock signal and said second clock signal.

23. The computer system as recited in claim 19, wherein said lock signal is generated in response to a zero sequence state signal (seq_state=Z) provided by a precision sequence detector.

24. The computer system as recited in claim 19, wherein said zero skew point indicator is provided by ANDing a cycle signal and a pd_z signal.

* * * * *

UNITED STATES PATENT AND TRADEMARK OFFICE
CERTIFICATE OF CORRECTION

PATENT NO. : 7,239,681 B2
APPLICATION NO. : 10/630297
DATED : July 3, 2007
INVENTOR(S) : Richard W. Adkisson It is certified that error appears in the above-identified patent and that said Letters Patent is hereby corrected as shown below:

In column 7, line 66, delete "ssequence" and insert -- sequence --, therefor.

In column 8, line 39, delete "ssequnce" and insert -- sequence --, therefor.

In column 10, line 6, delete "bock 314" and insert -- block 314 --, therefor.

In column 14, line 34, in Claim 1, after "cycles to" delete "N" and insert -- M --, therefor.

In column 15, line 48, in Claim 13, delete "pint" and insert -- point --, therefor.

Signed and Sealed this

Twelfth Day of August, 2008

JON W. DUDAS
*Director of the United States Patent and Trademark Office*